(12) United States Patent
Gorodetsky et al.

(10) Patent No.: US 12,014,518 B2
(45) Date of Patent: Jun. 18, 2024

(54) MIXED DEPTH OBJECT DETECTION

(71) Applicant: ZEBRA TECHNOLOGIES CORPORATION, Lincolnshire, IL (US)

(72) Inventors: Vlad Gorodetsky, North York (CA); Giorgio Gallina, Hamilton (CA); Anshul V. Joshi, Mississauga (CA); Richard Jeffrey Rzeszutek, Toronto (CA); Joseph Lam, North York (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/900,392

(22) Filed: Aug. 31, 2022

(65) Prior Publication Data

US 2022/0414926 A1 Dec. 29, 2022

Related U.S. Application Data

(62) Division of application No. 16/932,174, filed on Jul. 17, 2020, now Pat. No. 11,450,024.

(51) Int. Cl.
| | |
|---|---|
| *G06T 7/70* | (2017.01) |
| *G01S 17/894* | (2020.01) |
| *G06T 7/13* | (2017.01) |
| *G06T 7/73* | (2017.01) |

(52) U.S. Cl.
CPC ............. *G06T 7/74* (2017.01); *G01S 17/894* (2020.01); *G06T 7/13* (2017.01); *G06T 2207/10028* (2013.01)

(58) Field of Classification Search
CPC ... G06T 7/74; G06T 7/13; G06T 2207/10028; G06T 7/70; G01S 17/894; G01S 17/86; G01S 17/931
See application file for complete search history.

(56) References Cited

U.S. PATENT DOCUMENTS

2019/0311486 A1* 10/2019 Phan .................... G06T 7/50

FOREIGN PATENT DOCUMENTS

CN           105809681        *   7/2016

OTHER PUBLICATIONS

Machine translation for CN 105809681 (Year: 2016).*

* cited by examiner

*Primary Examiner* — Qian Yang

(57) ABSTRACT

A method includes obtaining a point cloud captured by a depth sensor, and image data captured by an image sensor, the point cloud and the image data representing a support structure bearing a set of objects; obtaining an image boundary corresponding to an object from the set of objects; determining a portion of the point cloud corresponding to the image boundary; selecting, from the determined portion, a subset of points corresponding to a forward surface of the object; and generating a three-dimensional position of the object based on the forward surface.

5 Claims, 15 Drawing Sheets

MIXED DEPTH OBJECT DETECTION

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle in a retail facility for use in detecting product status information. The structure of shelves may vary along the aisle, however, which may complicate object detection and reduce the accuracy of status information detected from the captured data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
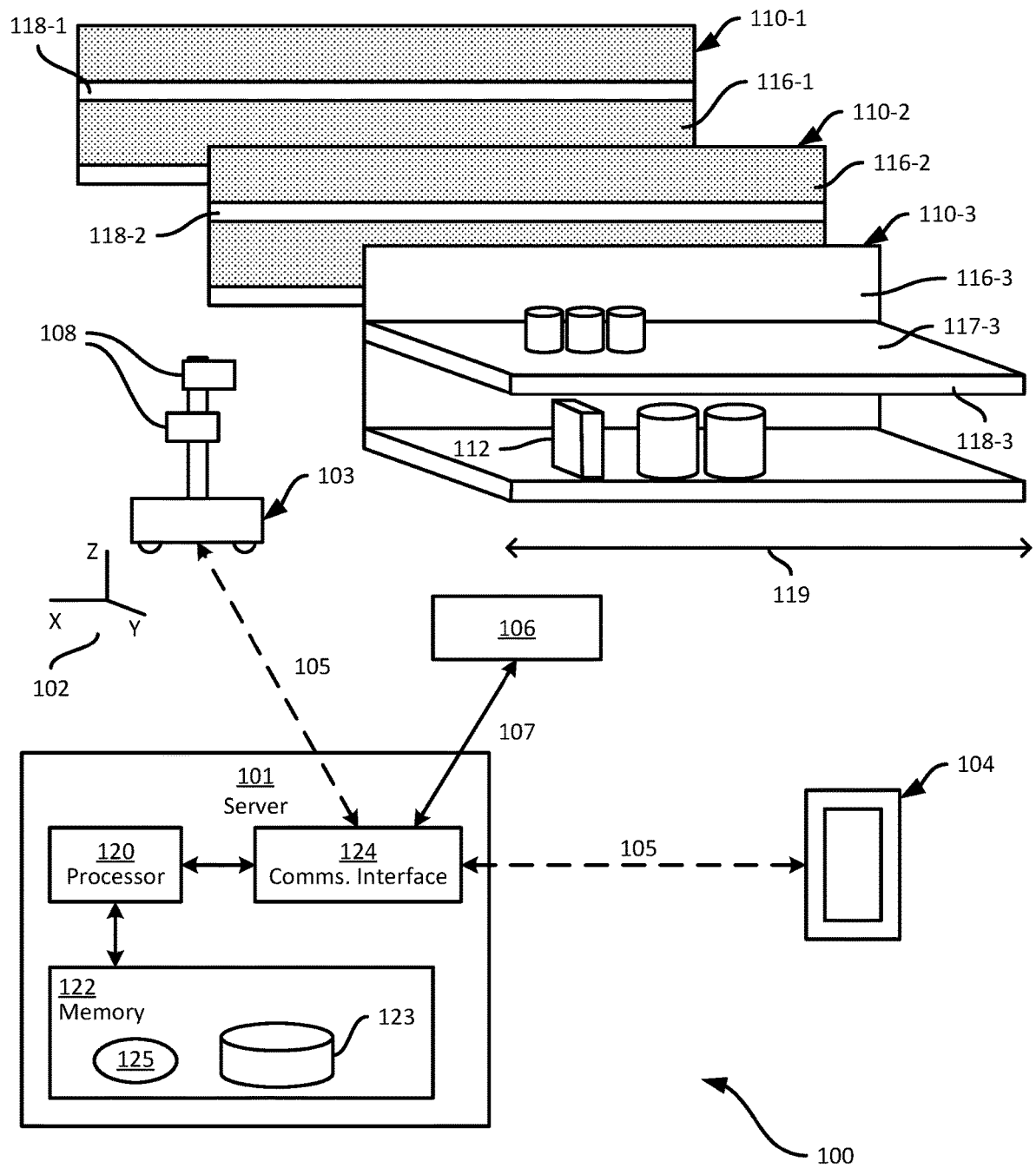
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining a point cloud captured by a depth sensor, and image data captured by an image sensor, the point cloud and the image data representing a support structure bearing a set of objects; obtaining an image boundary corresponding to an object from the set of objects; determining a portion of the point cloud corresponding to the image boundary; selecting, from the determined portion, a subset of points corresponding to a forward surface of the object; and generating a three-dimensional position of the object based on the forward surface.

Additional examples disclosed herein are directed to a method, comprising: obtaining a plurality of the three-dimensional positions derived from images captured by an image sensor and a point cloud captured by a depth sensor; selecting a subset of the three-dimensional positions corresponding to an object; projecting the selected three-dimensional positions to a sequence of candidate depths; determining, at each candidate depth, a cost function associated with the projections; and generating a combined three-dimensional position at a selected one of the candidate depths having the lowest cost function.

Further examples disclosed herein are directed to a method, comprising: obtaining (i) a point cloud, captured by a depth sensor, of a support structure and an obstruction, and (ii) a plurality of local support structure planes derived from the point cloud and corresponding to respective portions of the support structure; for each local support structure plane: selecting a membership set of points from the point cloud; generating a mask based on the membership set of points; selecting a subset of points from the point cloud based on the local support structure plane and the mask; and detecting obstructions from the subset of points.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. A variety of other support structures may also be present in the facility, such as pegboards and the like.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 maintains, in the memory 122, an application 125 executable by the processor 120 to perform such subsequent processing. In particular, as discussed in greater detail below, the server 101 is configured, via execution of the instructions of the application 125 by the processor 120, to determine three-dimensional positions (e.g. in the frame of reference 102) for various objects detected from the data captured by the apparatus 103.

The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
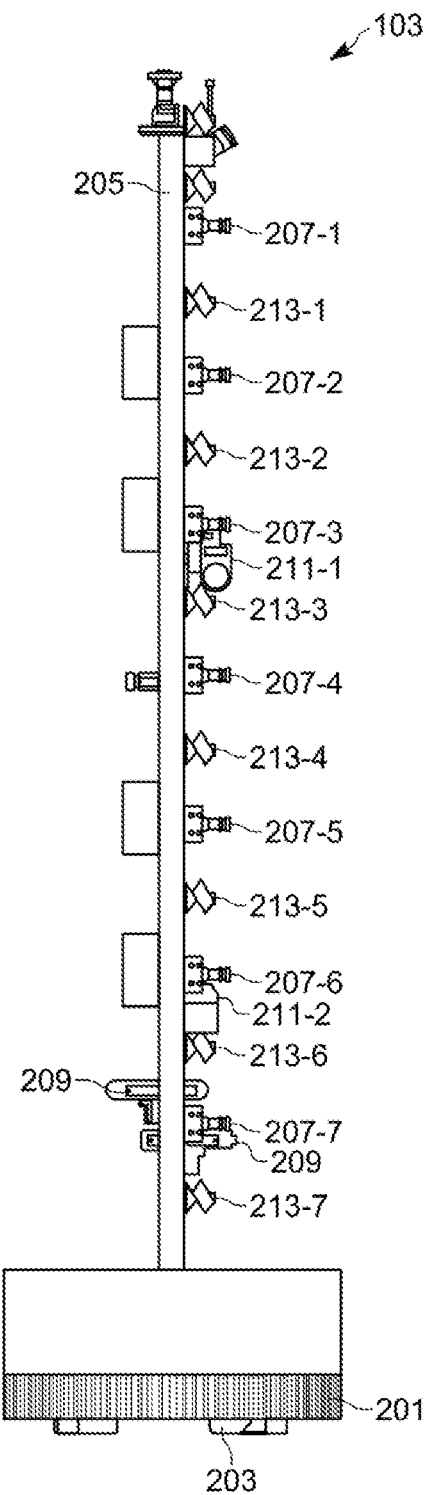
FIG. 2 is a side view of a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
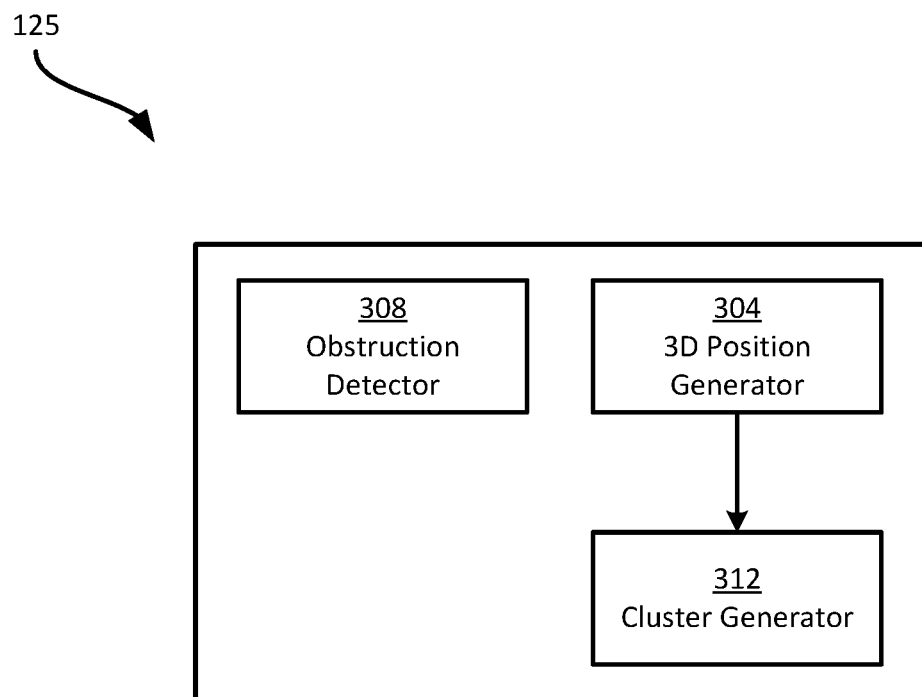
FIG. 3 is a block diagram of certain internal components of the server of FIG. 1.

Turning to FIG. 3, certain components of the application 125 are illustrated. As will be apparent to those skilled in the art, the application 125 can also be implemented as a suite of distinct applications in other examples. Further, some or all of the modules described below can be implemented via distinct control hardware such as one or more ASICs and/or FPGAs.

The application 125 includes a three-dimensional position generator 304 that is configured to obtain positions of detected objects (e.g. products on the shelves 110, product labels on shelf edges) in two dimensions, such as positions within 2D images captured by the apparatus 103. Another component of the server 101 or a separate computing device can be responsible for the detection of objects in the images and provision of the 2D positions to the application 125. Having obtained the 2D positions, as well as point cloud data corresponding to the shelves 110 where the objects were detected, the generator 304 is configured to identify which points in the point cloud represent the objects based on the 2D positions. In other words, the generator 304 is configured to project the 2D image-based positions into the point cloud.

The application 125 also includes an obstruction detector 308. The detector 308 is configured to obtain point cloud data captured by the apparatus 103 depicting shelves 110, and to detect irregular objects from the point cloud data. Irregular objects, also referred to herein as obstructions, include objects that may not be readily detectable by the processes used to detect 2D positions of objects from images (which may then be used by the generator 304). Examples of obstructions include clip strips, which may hold coupons, samples or the like, and extend into the aisle from the front of a shelf module 110.

Each object detected from data captured by the apparatus 103 may appear in multiple captures. That is, each product label disposed on a shelf edge 118, and each clip strip or other obstruction, may appear in multiple image frames and/or point clouds, because the apparatus 103 may capture a sequence of images and point clouds as it traverses an aisle. The application 125 therefore also includes a cluster generator 312 that is configured to accept 3D positions of objects from the generator 304 and/or the detector 308, and to cluster such positions to yield a smaller set of positions each corresponding to a unique object. The output of the cluster generator 312 can be used to generate product status data and the like by a downstream process at the server 101 or another computing device.

Figure 4:
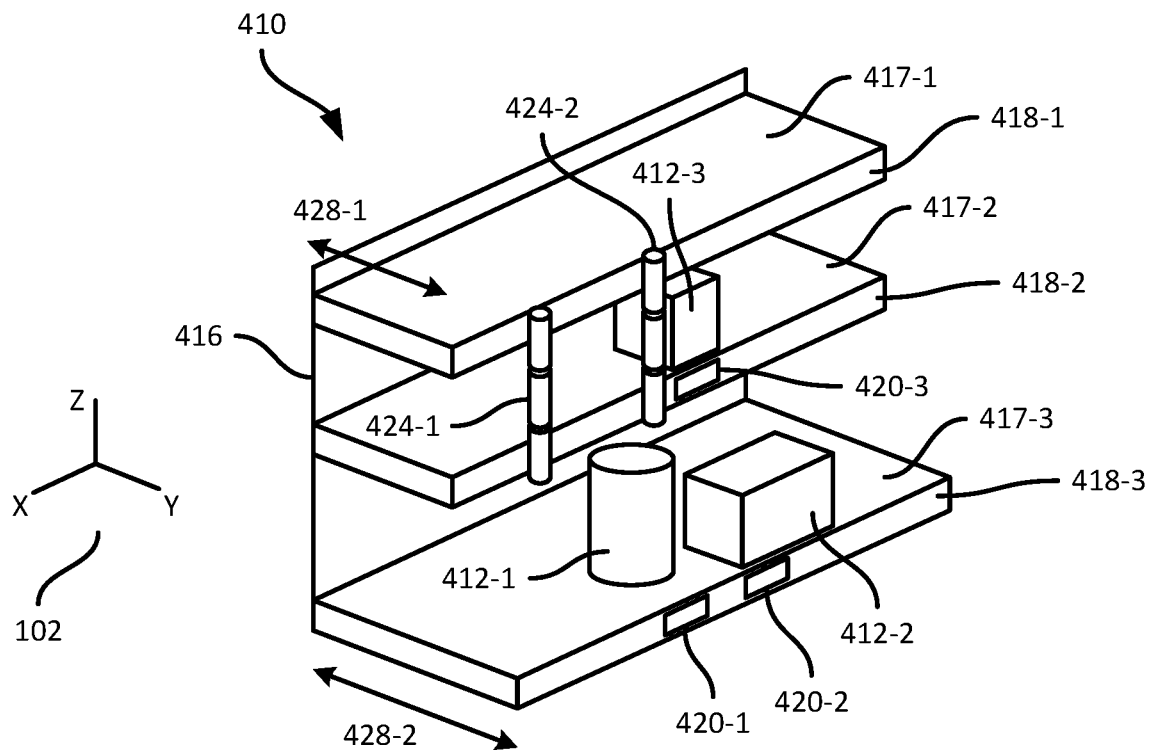
FIG. 4 is a diagram of a shelf module, shown in perspective and from the side.
Figure 4:
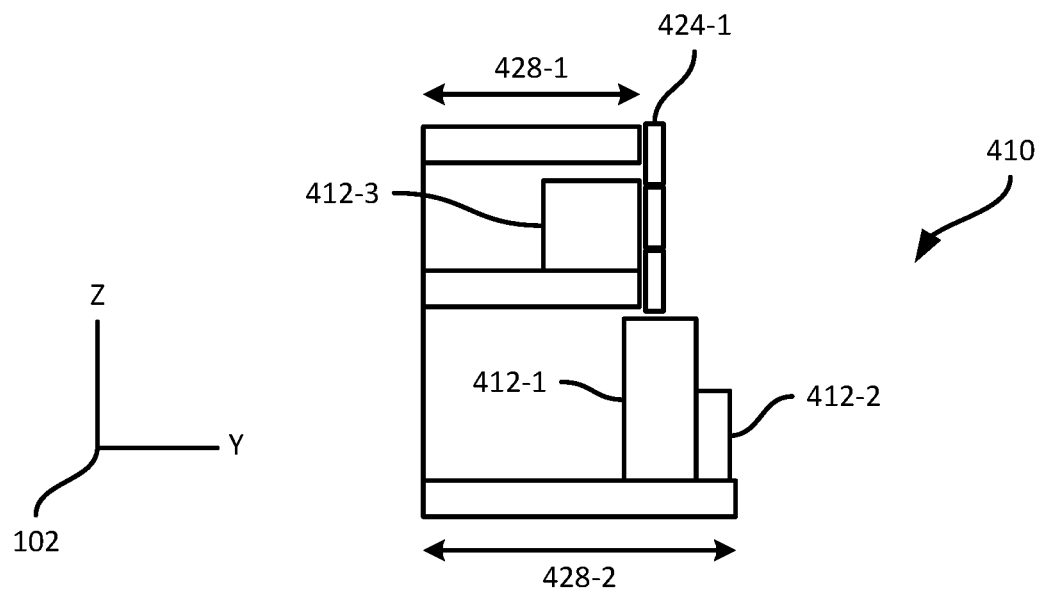

FIG. 4 illustrates a module 410 including three shelves. As discussed in connection with the modules 110 in FIG. 1, the shelves of the module 410 includes support surfaces 417-1, 417-2 and 417-3 extending from a shelf back 416 to respective shelf edges 418-1, 418-2 and 418-3. The shelf edge 418-3 supports two labels 420-1 and 420-2, corresponding to products 412-1 and 412-2, respectively. The shelf edge 418-2, meanwhile, supports a label 420-3 corresponding to a product 412-3. The shelf edge 418-1 as shown does not support any products, but does support obstructions such as clip strips 424-1 and 424-2, which hang from the shelf edge 418-1 down to the shelf edge 412-2.

FIG. 4 also includes a side view of the module 410, showing that the shelf edges 418-1 and 418-2 are at a different depth (i.e. position along the Y axis of the frame of reference 102) than the shelf edge 418-3. In particular, the shelf edges 418-1 and 418-2 have a depth of 428-1 as measured from the back 416, while the shelf edge 418-3 has a greater depth 428-2.

The different depths of the shelf edges 418 can negatively affect the accuracy of certain mechanisms for detecting objects such as the labels 420 and products 412. For example, some mechanisms accept as input a single vertical (i.e. aligned with the XZ plane of the frame of reference 102) shelf plane containing the shelf edges 418. Two-dimensional positions of objects such as the labels 420, acquired by detection from images captured by the apparatus 103, can be employed to determine 3D positions of the labels 420 by projecting such 2D positions onto the shelf plane. When no single shelf plane accurately defines the positions of the shelf edges 418, however, the above mechanism may produce inaccurate 3D positions for the labels 420. Inaccurate positioning of detected objects can also lead to incorrect detection of multiple objects where in reality there is only one.

Further, some mechanisms employed to detect obstructions such as the clip strips 424 employ a shelf plane as mentioned above, to partition a captured point cloud into points in front of the shelf plane (i.e. in the aisle) and points behind the shelf plane (i.e. over the support surfaces 417). The points in the aisle may then be evaluated according to various criteria to detect obstructions (as opposed to noise or products 412 sticking off the shelves). However, in modules such as the module 410, the mixed depth of the shelf edges 418 renders the use of a single shelf plane as described above impractical.

The server 101 is therefore configured, as described below in greater detail, to implement mechanisms for determining 3D positions of image-detected objects such as the labels 420, and for determining 3D positions of point-cloud detected obstructions such as the clip strips 424, in a manner that is robust to the presence of mixed depth shelf edges 418.

Figure 5:
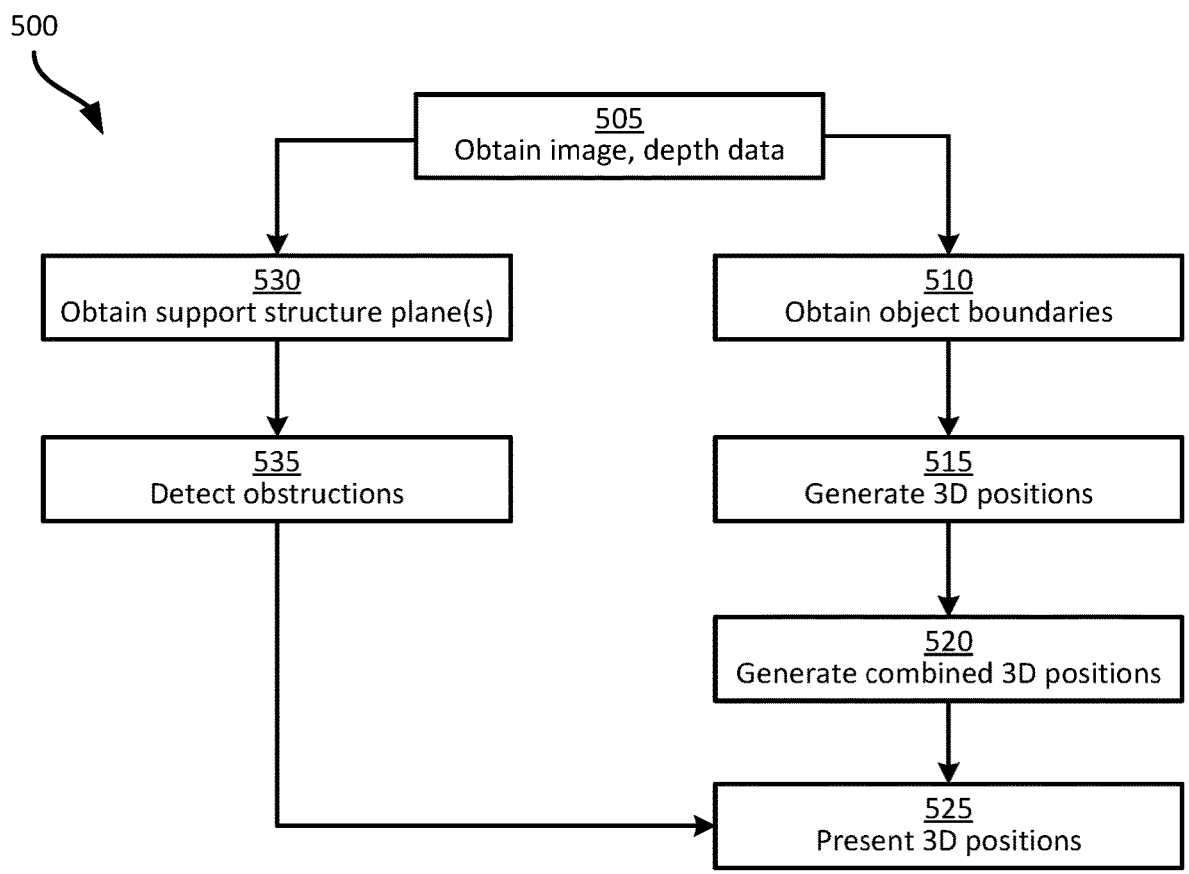
FIG. 5 is a flowchart of a method of generating 3D positions for objects in captured data.

FIG. 5 shows a flowchart of a method 500 of obtaining 3D positions for objects from captured data representing support structures such as the module 410. Although the method 500 can be implemented to detect objects for a wide variety of support structures, including those with uniform shelf depth, the method 500 will be discussed below in conjunction with its performance to detect objects on a support structure with mixed shelf depth, such as the module 410. The method 500 as described below is performed by the server 101, and in particular by the application 125. In other examples, however, at least some of the functionality implemented via the method 500 can be performed by another computing device, such as the apparatus 103.

At block 505, the server 101 is configured to obtain image and depth data (i.e. one or more point clouds) depicting a support structure. The image data may include a plurality of 2D images previously captured by the apparatus 103, e.g. while traversing an aisle including support structures such as the module 410. The point cloud includes a plurality of points with coordinates defined in three dimensions, e.g. according to the frame of reference 102, captured by the apparatus 103 during the above-mentioned traversal of the support structures. A plurality of individual point clouds can be obtained at block 505, however in the discussion below a single point cloud will be discussed for clarity of illustration. The single point cloud can be produced from multiple individual point cloud captures by the apparatus 103. The images and point cloud obtained at block 505 may be retrieved from the repository 123, for example.

Figure 6:
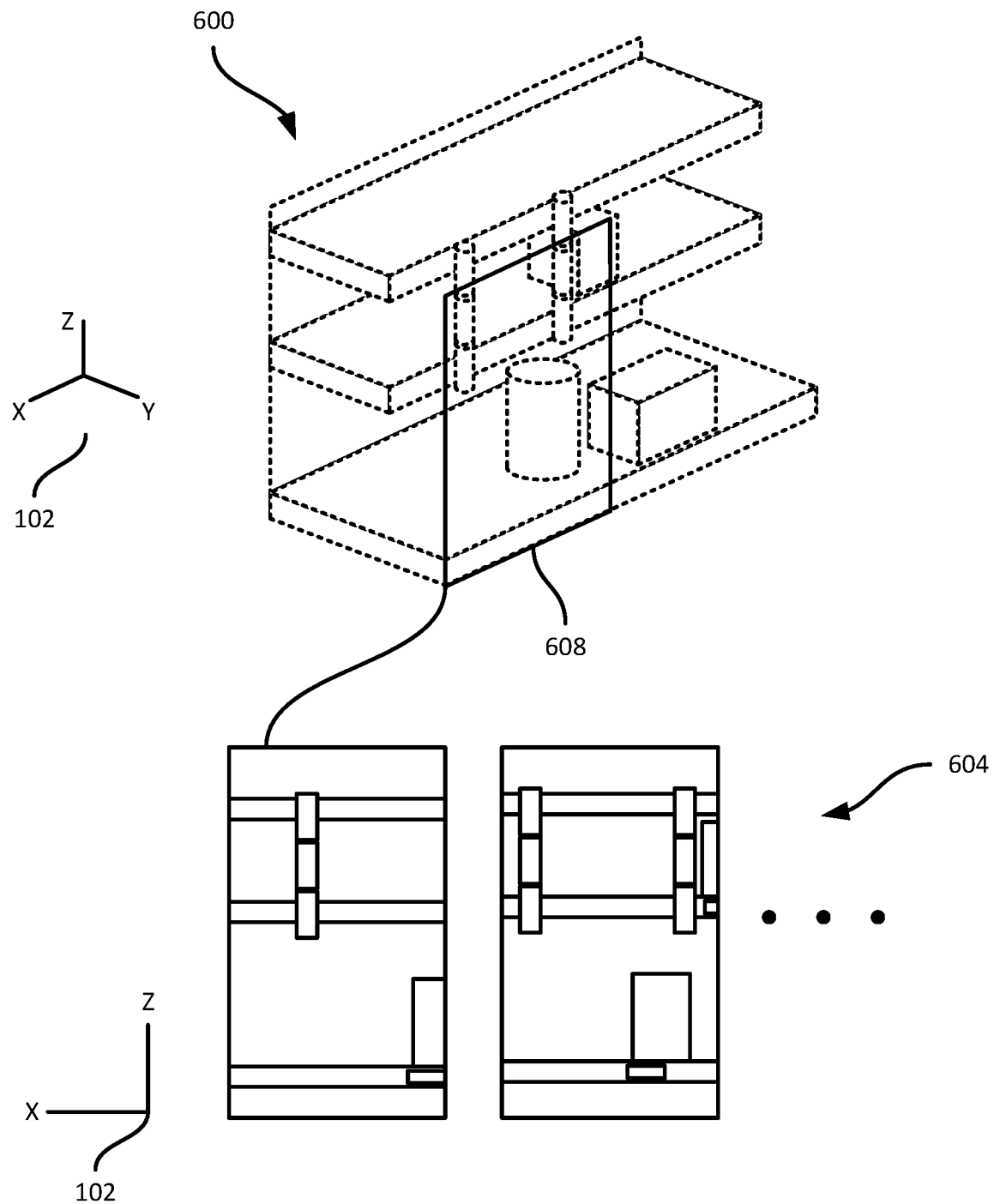
FIG. 6 is a diagram illustrating data captured via an example performance of block 505 of the method of FIG. 5.

FIG. 6 illustrates an example point cloud 600 and an example set 604 of images obtained at block 505. As is evident from FIG. 6, the point cloud 600 depicts the module 410. The labels 420 are not shown in the point cloud 600, because they are coplanar with the shelf edges 418 in this example, and therefore may not be distinguishable from the shelf edges 418 from the point cloud 600 alone. The set 604 of images also depict the module 410, with each image corresponding to a particular portion of the module 410 as the apparatus traversed the length of the module 410. An example portion 608 corresponding to the first image in the set 604 is illustrated. As seen in FIG. 6, the set 604 of images overlap, such that each object (e.g. clip strips 424, products 412) are shown in more than one image.

Returning to FIG. 5, following acquisition of the images and point cloud, the server 101 is configured to perform two branches of functionality to determine 3D positions for objects. One branch is performed to determine the 3D positions of objects such as the labels 420 that are initially detected from 2D images. The other branch is performed to detect objects that are difficult to detect from 2D images, including obstructions such as the clip strips 424.

Beginning with the generation of 3D positions for image-detected objects, at block 510 the server 101 is configured to obtain object boundaries detected from the set 604 of images mentioned above. Each object boundary obtained at block 510, in other words, is a two-dimensional boundary such as a bounding box indicating a portion of an images in the set 604 where a given object has been detected. The boundary may therefore also be referred to as an image boundary (having been derived from image data, rather than from point cloud data). The detection of objects from the images can be performed according to any suitable object detection mechanism, which need not be implemented within the application 125. That is, object detection from the images obtained at block 505 is performed separately from the method 500, by another application at the server 101, or by another computing device. Examples of such detection mechanisms include feature recognition algorithms, machine learning-based object detection, and the like.

Figure 7:
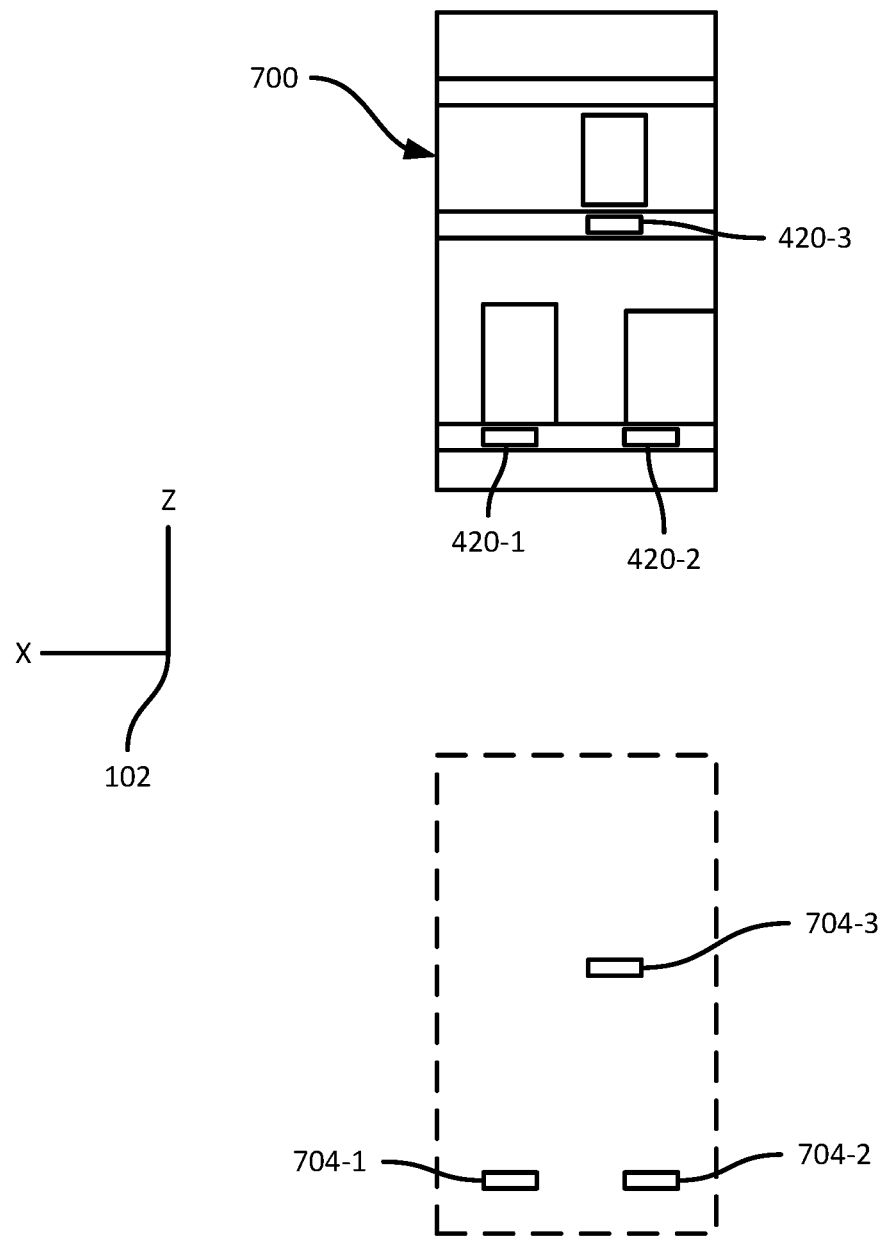
FIG. 7 is a diagram illustrating data obtained via a performance of block 510 of the method of FIG. 5.

The object boundaries obtained at block 510 indicate the position of objects in two dimensions, e.g. along the X and Z axes of the frame of reference 102. However, the object boundaries do not indicate the depth (along the Y axis of the frame of reference 102) of the objects. Turning briefly to FIG. 7, an example image 700 is shown, depicting the labels 420-1, 420-2 and 420-3. FIG. 7 also illustrates boundaries 704-1, 704-2 and 704-3 corresponding to the labels 420, as detected from the image 700. The boundaries 704 are defined as bounding boxes (e.g. coordinates for each corner of the boundary 704 along the X and Z axes of the frame of reference 102). As will be apparent, the boundaries obtained at block 510 may include boundaries for other objects, as well as additional detected boundaries for the labels 420 from other images. That is, the boundaries obtained at block 510 may include a plurality of boundaries for each detected object.

At block 515, the server 101, and particularly the 3D position generator 304, is configured to convert the 2D positions detected from images into 3D positions in the frame of reference 102. In general, the server 101 generates 3D positions from a given 2D boundary obtained at block 510 by determining a portion of the point cloud obtained at block 505 that corresponds to the boundary (i.e. that could contain the object identified by the boundary), and then by identifying a surface within that portion of the point cloud that is likely to correspond to the object.

Figure 8:
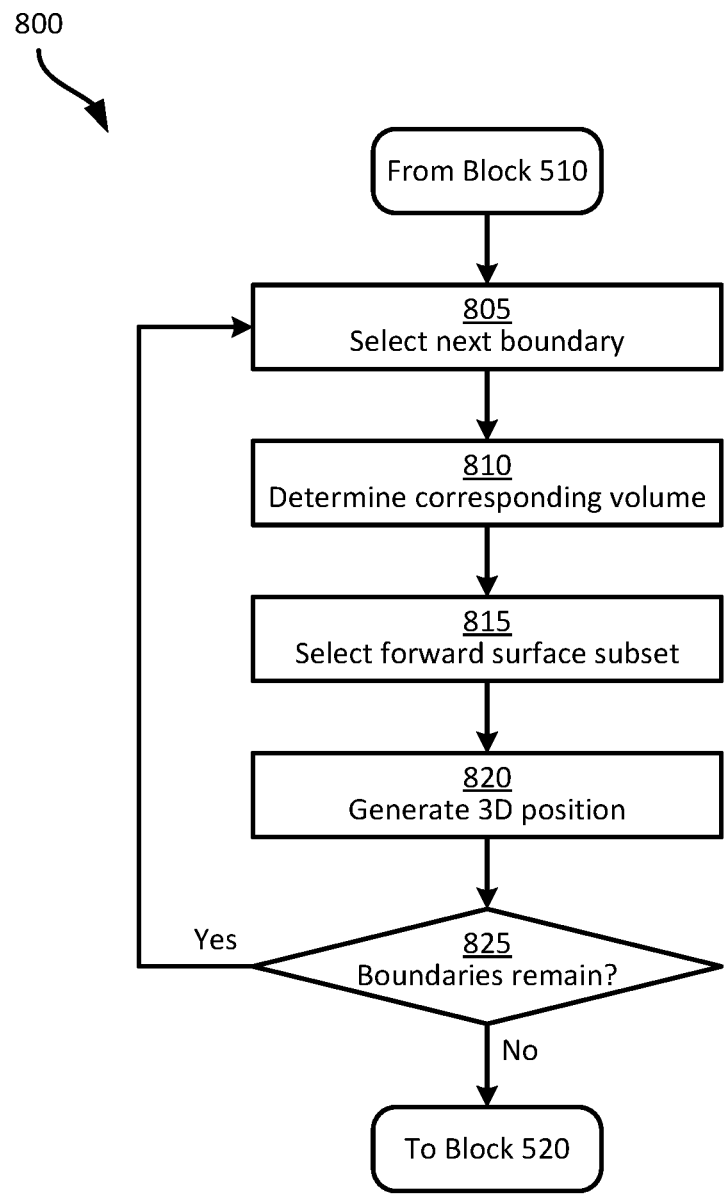
FIG. 8 is a flowchart of a method of performing block 515 of the method of FIG. 5.

FIG. 8 illustrates a method 800 of performing the generation of 3D positions at block 515. At block 805, the server 101 selects the next boundary for processing. In the present example, the boundary 704-3 is selected for processing. At block 810, the server 101 determines a volume of the point cloud from block 505 that corresponds to the selected boundary. As will be apparent to those skilled in the art, although the depth at which the object corresponding to each boundary 704 resides is unknown, the boundary 704 nevertheless constrains the possible positions of the object within the point cloud.

Figure 9:
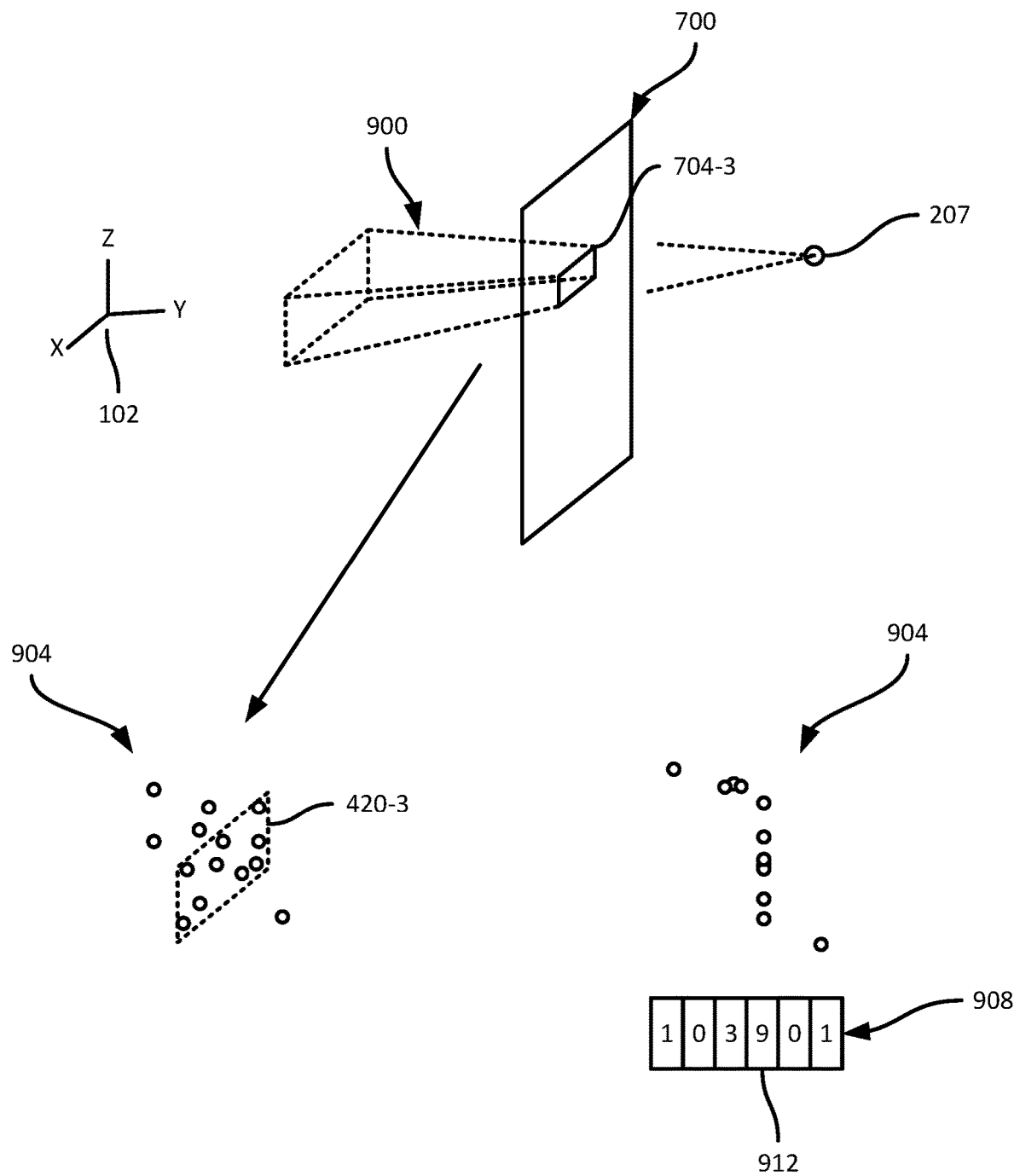
FIG. 9 is a diagram illustrating a performance of the method of FIG. 8.

Turning to FIG. 9, an image sensor 207 is shown, along with the boundary of the image 700. The image 700 represents the full extent of a field of view of the image sensor 207, whose position relative to the point cloud is known (e.g. because the tracked pose of the apparatus 103, mentioned earlier, is stored in conjunction with the image 700). The position and size of the boundary 704-3 within the image 700 indicates which portion of the field of view of the image sensor 207 captured the pixels within the boundary 704-3. Based on the known location of the image sensor 207 relative to the point cloud 600, therefore, and based on operational parameters of the image sensor 207 that define the size and shape of the image sensor field of view, the server 101 determines a portion 900 of the field of view that corresponds to the boundary 704-3. That is, regardless of the depth of the object represented by the boundary 704-3, any points representing the object are within the portion 900. The portion 900 can be defined, for example, by a set of planes defining a pyramid-shape region in the point cloud 600.

Having defined the volume 900 corresponding to the boundary 704-3, at block 815 the server 101 is configured to select a subset of points from the volume 900 that correspond to a forward surface of the object. As will be apparent to those skilled in the art, the volume 900 may contain points that do not correspond to the relevant object (e.g. the label 420-3 in the present example). For example, the boundary 704-3 may not correspond exactly to the actual edges of the label 420-3. To identify which points within the volume 900 are likely to correspond to the label 420-3, the server 101 is configured to identify the closest group of points in the volume 900 to the image sensor 207 (i.e. along the Y axis of the frame of reference 102).

Turning again to FIG. 9, a group 904 of points from the point cloud 600 that fall within the volume 900 are shown, along with the actual position of the label 420-3. The group 904 thus includes points that correspond to the label 420-3, but also includes points that correspond to the support surface 417-2, capture noise, or the like. FIG. 9 also illustrates the group 904 from the side, from which it can be seen that a majority of the points in the group 904 have similar depths, likely indicating the presence of a contiguous surface (i.e. the label 420-3). To identify such a surface, the server 101 can be configured to generate a histogram 908 in which each bin corresponds to a given depth range along the Y axis. The value of each bin indicates how many points from the group 904 fall within the corresponding depth range. The server 101 can then select the bin having the highest value, and select the depth corresponding to that bin (e.g. the average of the depth range represented by the bin) as the depth for the object under consideration.

In the present example, therefore, the server 101 selects the bin 912 at block 815, and assigns the depth of the bin 912 to the boundary 704-3. That is, the depth of the bin 912 is selected to represent the forward surface of the label 420-3. Returning to FIG. 8, at block 820 the server 101 is configured to generate a 3D position for the boundary 704-3 by projecting the boundary 704-3 to the depth selected at block 815. Such a projection places the boundary 704-3 at the selected depth within the volume 900, and therefore determines the coordinates, in three dimensions according to the frame of reference 102, of the boundary 704-3.

At block 825, the server 101 returns to block 805 if boundaries 704 remain to be processed, or proceeds to block 520 if all boundaries 704 have been processed to determine their 3D positions.

Returning to FIG. 5, at block 520 the server 101 is configured to generate combined 3D positions for each detected object. The performance of block 520 may also be referred to as clustering the 3D positions from block 515. As noted earlier, each object in the module 400 is likely to be shown in more than one image in the set 604, and therefore more than one boundary is likely to be generated for the object, and converted to a 3D boundary at block 515. At block 520, the server 101 identifies sets of 3D positions that are likely to correspond to the same object, and generates a single combined position for the object.

Figure 10:
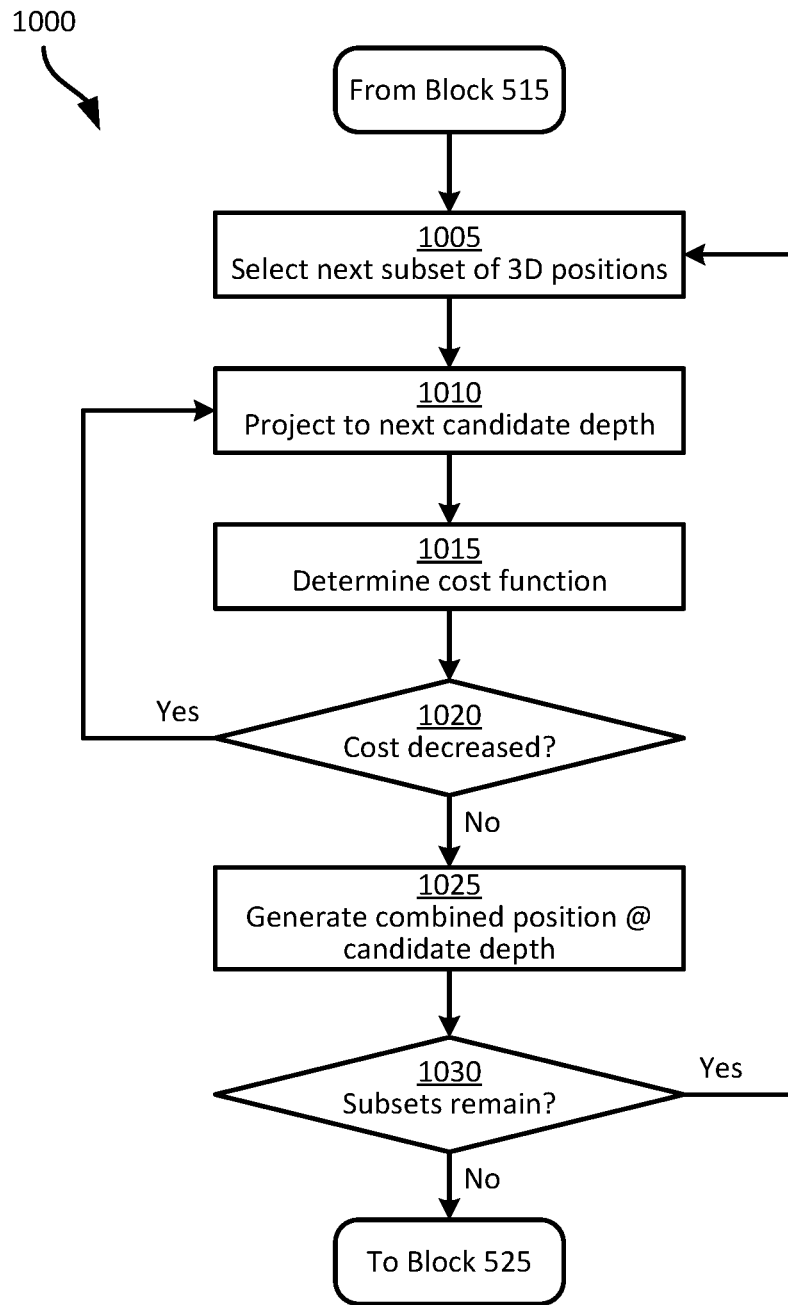
FIG. 10 is a flowchart of a method of performing block 520 of the method of FIG. 5.

Turning to FIG. 10, a method 1000 of generating combined 3D positions at block 520 is shown. The method 1000 is performed, in the present example, by the cluster generator 312. At block 1005, having obtained (via the performance of block 515) 3D positions for each object boundary received at block 510, the server 101 is configured to select a subset of 3D positions for processing. The subset of 3D positions selected at block 1005 corresponds to a single physical object. The selection of the subset can be based on metadata or other properties stored in conjunction with the boundaries obtained at block 510. For example, in the case of boundaries representing labels 420, the boundaries may be obtained along with data decoded from label barcodes identified in the image set 604. Thus, a subset of 3D positions generated from boundaries associated with the same barcode data may be selected at block 1005.

Figure 11:
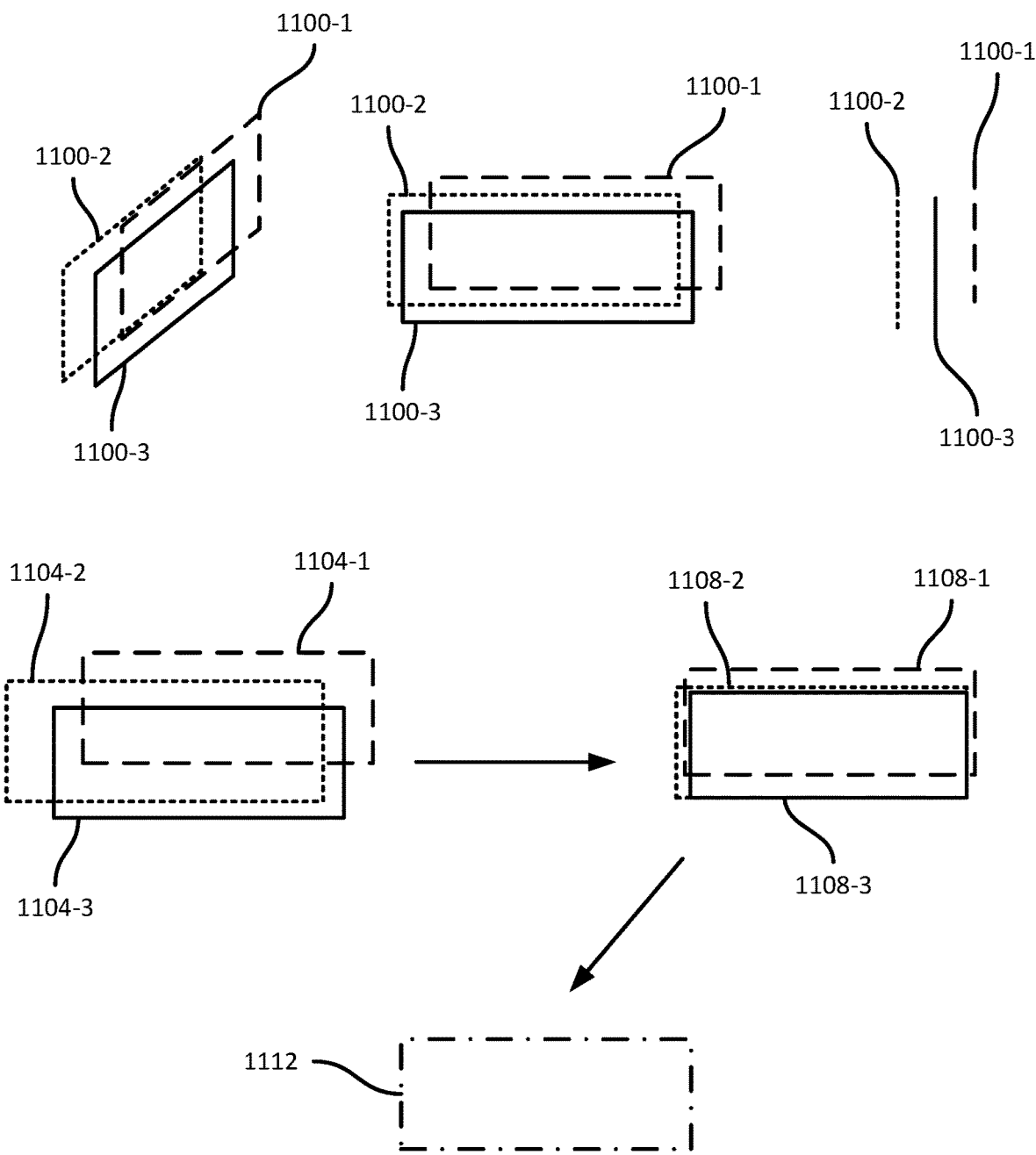
FIG. 11 is a diagram illustrating a performance of the method of FIG. 10.

FIG. 11 illustrates a subset of 3D positions 1100-1, 1100-2 and 1100-3 all associated with the same barcode data and therefore assumed to correspond to the same single label 420 (e.g. the label 420-3). The 3D positions 1100 are also shown from the front and from the side to illustrate the differences in position and depth between each 3D position 1100. That is, the position derived from each image-based detection of the label 420-3 may not be entirely consistent with the other positions derived from other images also showing the label 420-3. The server 101 therefore, via the method 1000, identifies a single 3D position likely to accurately represent the true location of the label 420-3.

At block 1010 the server 101 is configured to project each of the positions 1100 to the first of a sequence of candidate depths. In the present example, the candidate depths are the depths of the positions 1100 themselves. Thus, at block 1010 the server 101 projects each of the positions 1100 to the depth of the forward-most position (e.g. the position 1100-1). The resulting projection for the position 1100-1 will be unchanged, but the position along the X and Z axes, as well as the size, of the positions 1100-2 and 1100-3 will be modified by the projection.

At block 1015, the server 101 is configured to determine a cost function representing a degree of agreement between the projections from block 1010. When, at block 1020, the server 1010 determines that the cost function is lower than in the previous iteration of block 1015, the next candidate depth is selected and blocks 1015 and 1020 are repeated. When the cost function does not decrease between iterations, the most recent candidate depth processed is employed to generate the combined position, at block 1025.

Referring again to FIG. 11, two example performances of blocks 1010-1020 are shown. In particular, at block 1010 the server 101 generates a first set of projections 1104-1, 1104-2 and 1104-3 at the depth of the 3D position 1100-1. The projection 1104-1 is therefore identical to the 3D position 1100-1, but the projections 1104-2 and 1104-3 are not identical to the 3D positions 1100-2 and 1100-3. The cost function determined at block 1015 may be, for example, the sum of distances between the centroids of the projections 1104 (that is, a sum of three distances). Following the first performance of block 1015 the determination at block 1020 is automatically affirmative.

FIG. 11 illustrates a second performance of block 1010, at which the positions 1100 are projected to the depth of the 3D position 1100-3. The second performance of block 1010 yields a set of projections 1108-1, 1108-2, and 1108-3. The cost function is recomputed at block 1015. As shown in FIG. 11, the centroids of the projections 1108 are separated by smaller distances than the centroids of the projections 1104. The determination at block 1020 is therefore affirmative, and blocks 1010, 1015 and 1020 are therefore repeated, projecting the positions 1100 to the depth of the position 1100-2. It is assumed, for illustrative purposes, that the centroids of the resulting projections from this third performance of block 1010 are at greater distances from one another than for the projections 1108. The determination at block 1020 is therefore negative, and the server 101 therefore proceeds to block 1025.

At block 1025, the server 101 generates a combined 3D position at the candidate depth with the lowest cost function (i.e. the depth of the 3D position 1100-3 in this example). The server 101 may, for example, determine an average position of the three projections 1108, e.g. by averaging the XZ coordinates of the corners of the projections 1108, to generate a single XZ coordinate for each corner of a combined position 1112. The depth (i.e. the Y coordinate) of the combined position 1112 can be equal to the depth of the position 1100-3. Following generation of the combined position 1112 at block 1025, the 3D positions 1100 may be discarded.

At block 1030, the server 101 determines whether any subsets of 3D positions remain to be processed. If the determination at block 1030 is affirmative, the server 101 returns to block 1005. Otherwise, the server 101 proceeds to block 525 of the method 500. At block 525, the server 101 is configured to present the 3D position(s) generated at block 520. The positions can be presented by rendering on a display, transmitting to another computing device such as the client device 105, passing to another application at the server 101 (e.g. to generate product status data), or the like.

Returning to FIG. 5, the second branch of processing for detecting obstructions such as the clip strips 424 will now be discussed, beginning at block 530. As noted earlier, the clip strips 424 and other obstructions may be difficult to detect from 2D images, and the server 101 is therefore configured to detect such objects directly from the point cloud 600.

Figure 12:
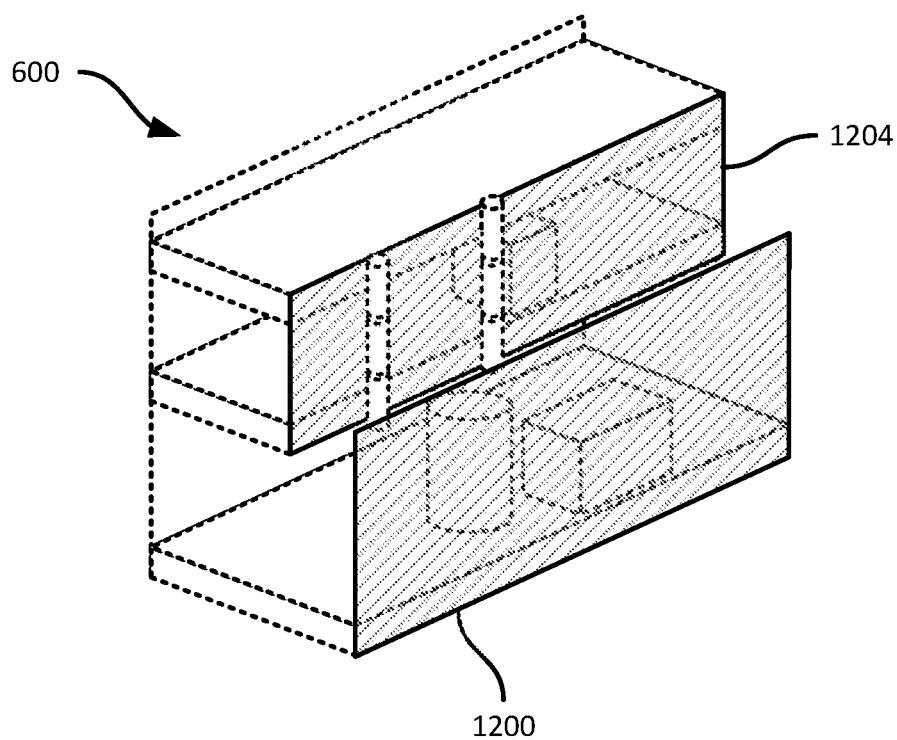
FIG. 12 is a diagram illustrating local support structure planes obtained at block 530 of the method of FIG. 5.

At block 530 the server 101 (specifically, the obstruction detector 308) obtains one or more local support structure planes. The detection of the local support structure planes is performed by another application at the server 101, or another computing device, and is therefore not discussed in greater detail herein. Turning to FIG. 12, two example local support structure planes 1200 and 1204 are shown, each corresponding to a portion of the point cloud 600. In particular, the plane 1200 is at the depth of the shelf edge 418-3, while the plane 1204 is at the depth of the shelf edges 418-1 and 418-2. The planes 1200 and 1204 thus not only have different depths, but also have different extents along the X and Z axes in the frame of reference 102.

Figure 13:
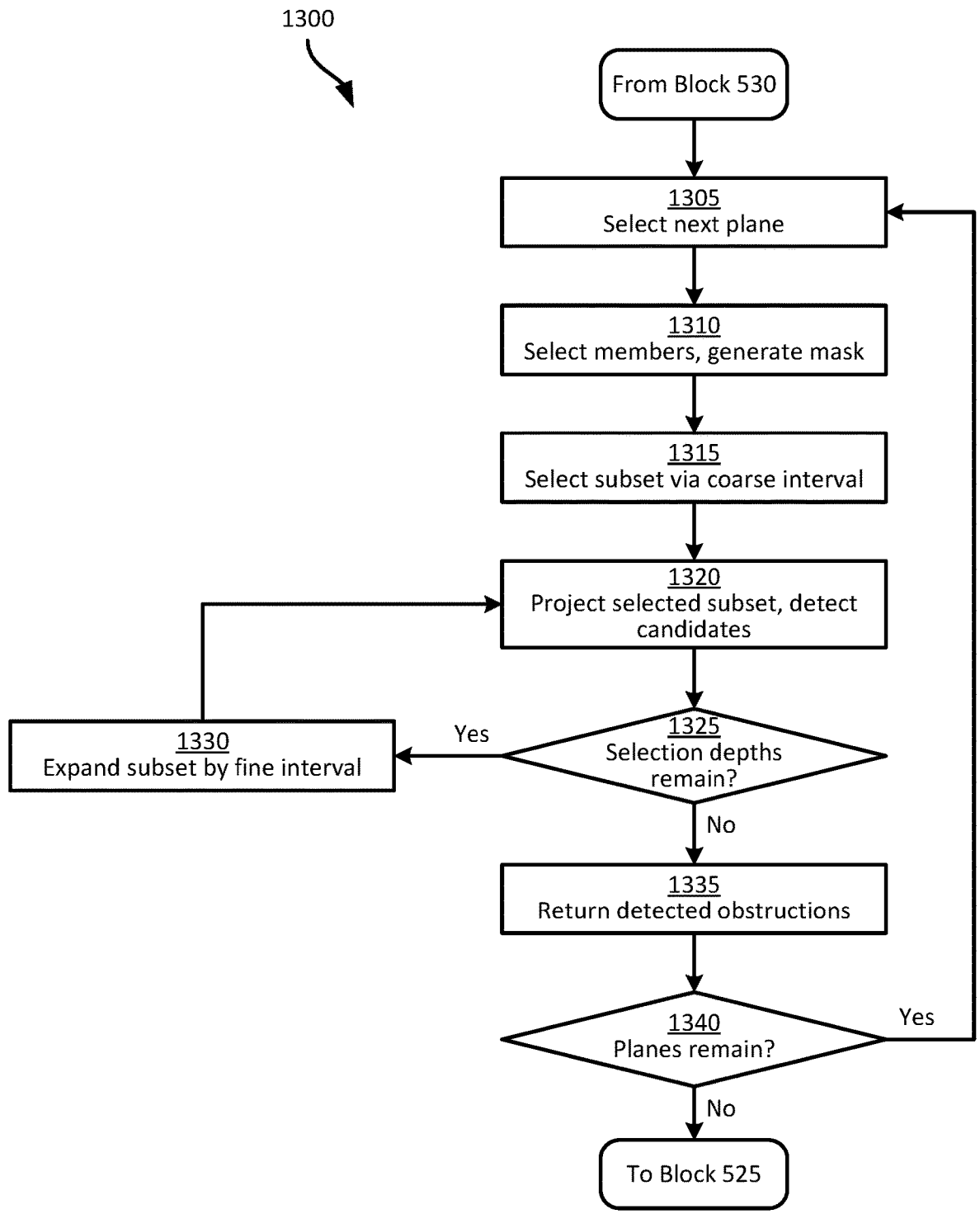
FIG. 13 is a flowchart of a method of performing block 535 of the method of FIG. 5.

At block 535, the server 101 is configured to detect obstructions based on each of the planes obtained at block 530. Turning to FIG. 13, a method 1300 of detecting obstructions at block 535 is illustrated. At block 1305, the server 101 selects a plane for processing. In the present example, it will be assumed that the plane 1204 is selected at block 1305.

At block 1310, the server 101 is configured to select a subset of the points in the point cloud 600 that are considered members of the plane from block 1305, and to generate a membership map, or mask, based on the selected members. Member points are those with X and Z coordinates within the bounds of the selected plane, and with depths (i.e. along the Y axis) within a threshold of the depth of the selected plane. The threshold is selected to encompass a typical range of obstruction depths, e.g. between about 5 and about 10 centimeters on either side of the selected plane. In some examples, the threshold can be different on either side of the plane (e.g. about 10 cm into the aisle from the plane, and about 2 cm behind the plane).

Thus, in the present example, the member points selected at block 1310 include those defining the shelf edges 418-1 and 418-2, as well as the points defining the forward surface of the product 412-3, the label 420-3 and the clip strips 424. However, the members do not include any points defining the product 412-1, even though at least some of those points may be within the depth threshold of the plane 1204 (because any points defining the product 412-1 are outside the X and Z bounds of the plane 1204.

Figure 14:
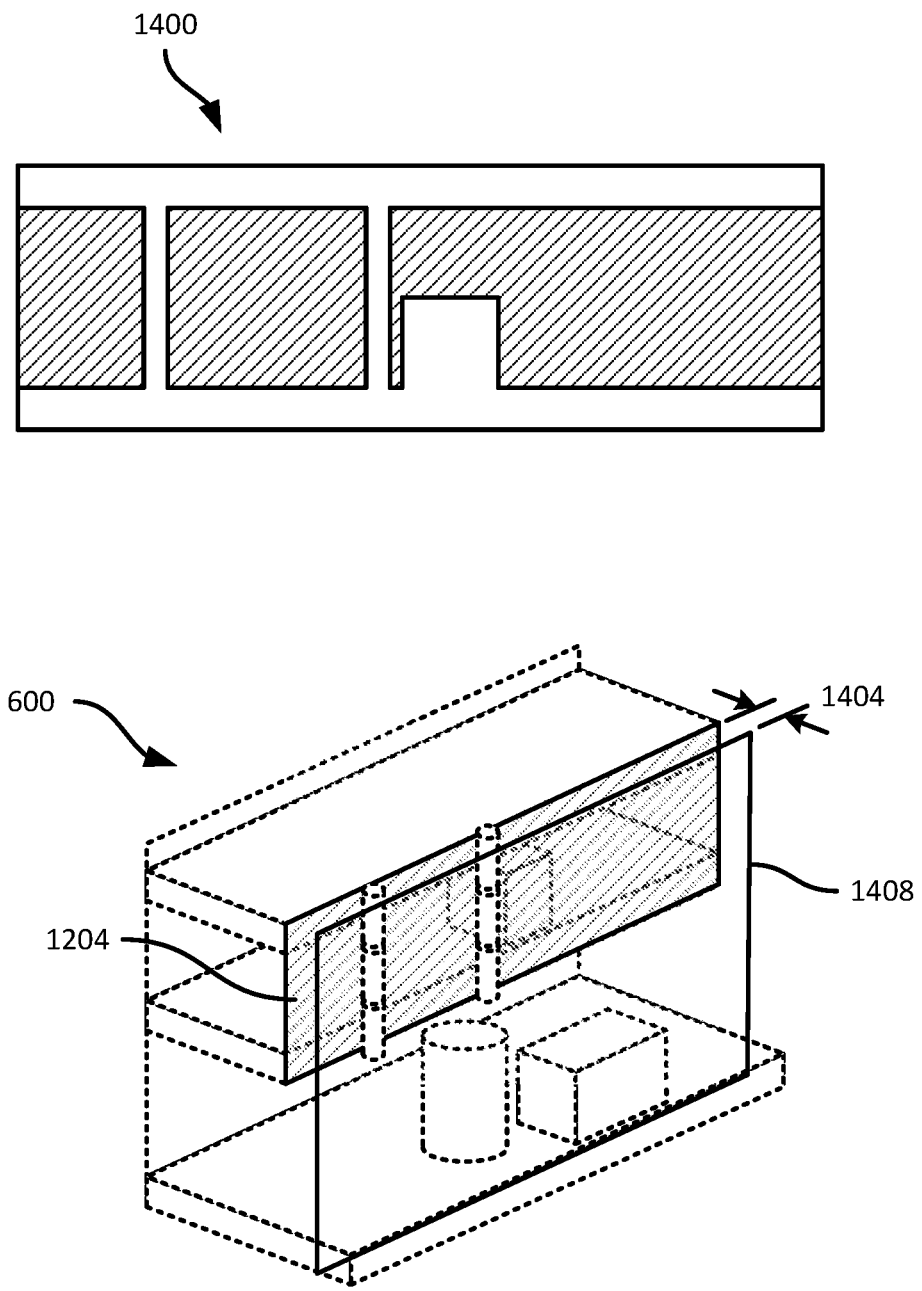
FIG. 14 is a diagram illustrating an example performance of blocks 1305-1315 of the method of FIG. 13.

To generate the mask, the server 101 projects all of the selected member points to the depth of the plane 1204. Optionally, the server 101 may perform a morphological operation such as dilation and/or erosion to fill gaps between the points. FIG. 14 illustrates an example mask 1400, in which the white portions (which may be referred to as a selection region) correspond to the product 412-3 and the clip strips 424, as well as the shelf edges 418-1 and 418-2. The shaded portions indicate regions that will not be inspected for detecting obstructions, as set out below.

Having generated the mask at block 1310, the server 101 is configured to detect obstructions based on both the plane 1204 (or more generally, the plane selected at block 1305) and the mask 1400. At block 1315, the server 101 sets a selection depth according to a coarse interval. Specifically, the selection depth set at block 1315 is set by decrementing the depth of the plane 1204 by the coarse interval. An example performance of block 1315 is illustrated at FIG. 14. Specifically, a coarse interval 1404 is illustrated, and a selection depth 1408 is defined as a plane parallel to the plane 1204 and located at a depth that is shifted forward (into the aisle) from the plane 1204 by the coarse interval 1404. Any points in front of the selection depth 1408 are selected in the subset at block 1315. A variety of coarse intervals can be employed, for example depending on the expected size of the obstructions. In the present example, the coarse interval is about 6 cm, although other coarse intervals smaller than, or larger than, 6 cm may be employed in other embodiments.

At block 1320, the points of the selected subset are projected to the selection depth 1408, but the mask 1400 is applied to the projection, such that any projected points outside the white portions of the mask 1400 are discarded. That is, although at least a portion of the products 412-1 and 412-2, as well as the shelf edge 418-3, are in front of the selection depth 1408, points defining those objects are omitted from the projection because they fall outside the white portion of the mask 1400.

The projection resulting from block 1320 is processed to detect obstruction candidates therein. For example, blob detection or the like can be performed to detect contiguous regions in the projection that may correspond to objects such as the clip strips 424. When such regions are detected, they may be compared to various criteria, such as a minimum size (e.g. area), and a number of detections. If a region exceeds a minimum size it may be retained for further processing, otherwise the region may be discarded.

At block 1325, the server 101 determines whether additional selection depths remain to be processed. The server 101 is configured to process a predefined set of selection depths, from the initial selection depth 1408 to a final selection depth, which maybe behind the plane 1204. When the determination at block 1325 is affirmative, the server 101 is configured to expand the selected subset of points by a fine interval. Specifically, the server 101 is configured to shift the selection depth backwards (away from the aisle) by a smaller interval than the coarse interval (e.g. about 1 cm). The server 101 is then configured to repeat the performance of block 1320 for the new selection depth, which will now capture a greater number of points than the initial selection depth 1408.

Figure 15:
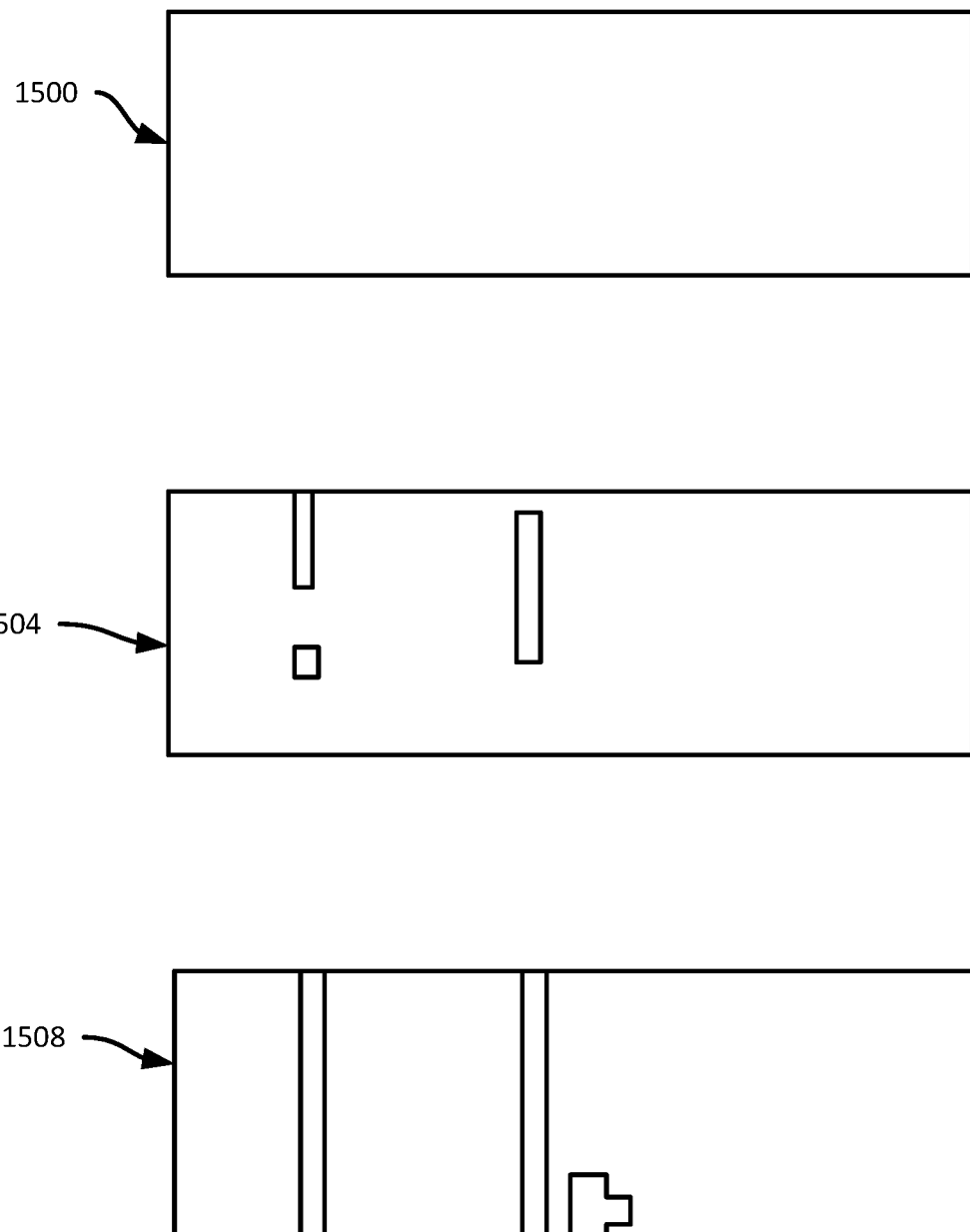
FIG. 15 is a diagram illustrating successive performances of blocks 1320-1330 of the method of FIG. 13.

Turning to FIG. 15, a set of projections 1500, 1504 and 1508 generated at successive performances of block 1320 are shown. As seen in FIG. 15, successively greater selection depths (i.e. closer to the shelf back 416) capture successively greater portions of the point cloud 600, but only points within the bounds of the mask 1400 are considered. The projection 1500 contains no points, while the projection 1504 contains portions of the clip strips 424, and the projection 1508 contains further portions of the clip strips 424, as well as a portion of the product 412-3.

An obstruction is detected when the selection depths have been exhausted, and the obstruction is detected in the same region of the projections for at least a threshold number of projections (e.g. two). For each detected obstruction, the server 101 may generate a three-dimensional bounding box fitted to the points that contributed to the detection. Thus, the server 101 may generate a bounding box fitted to the points corresponding to each of the clip strips 424 as represented in the projections 1500, 1504, and 1508.

The server 1325, when all selection depths have been processed, returns any detected obstructions at block 1335.

The above process is then repeated for any remaining planes (e.g. the plane 1200). When no planes remain to be processed, the server 101 returns to block 525 of the method 500, as described earlier.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining a plurality of three-dimensional positions derived from images captured by an image sensor and a point cloud captured by a depth sensor;
   selecting a subset of the three-dimensional positions corresponding to an object;
   projecting the selected three-dimensional positions to a sequence of candidate depths;
   determining, at each candidate depth, a cost function associated with the projections; and
   generating a combined three-dimensional position at a selected one of the candidate depths having a lowest one of the cost functions determined at each candidate depth,
   wherein obtaining each of the three-dimensional positions includes:
      obtaining point cloud and image data representing a support structure bearing the object;
      obtaining an image boundary corresponding to the object;
      determining a portion of the point cloud corresponding to the image boundary;
      selecting, from the determined portion, a subset of points corresponding to a forward surface of the object, and
      generating the three-dimensional position based on the forward surface.

2. The method of claim 1, further comprising: determining that the three-dimensional positions correspond to the object by comparing item identifiers associated with the three-dimensional positions.

3. The method of claim 1, wherein the cost function includes a sum of distances between the projections.

4. The method of claim 1, wherein generating the combined three-dimensional position includes determining an average of the projections to the selected candidate depth.

5. The method of claim 1 wherein the candidate depths include depths corresponding to each of the three-dimensional positions.

* * * * *